US010785769B2

(12) United States Patent
Hwang et al.

(10) Patent No.: US 10,785,769 B2
(45) Date of Patent: *Sep. 22, 2020

(54) PHYSICAL DOWNLINK CONTROL CHANNEL DESIGN FOR 5G NEW RADIO

(71) Applicant: MEDIATEK INC., Hsin-Chu (TW)

(72) Inventors: Chien-Hwa Hwang, Hsin-Chu (TW); Weidong Yang, San Jose, CA (US); Pei-Kai Liao, Hsin-Chu (TW); Wei-De Wu, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,373

(22) Filed: Sep. 3, 2019

(65) Prior Publication Data

US 2020/0008181 A1 Jan. 2, 2020

Related U.S. Application Data

(63) Continuation of application No. 15/865,229, filed on Jan. 8, 2018, now Pat. No. 10,440,703.

(Continued)

(51) Int. Cl.
*H04W 72/04* (2009.01)
*H04L 1/18* (2006.01)
(Continued)

(52) U.S. Cl.
CPC ......... *H04W 72/042* (2013.01); *H04L 1/0009* (2013.01); *H04L 1/0041* (2013.01);
(Continued)

(58) Field of Classification Search
CPC ... H04W 72/04; H04W 72/042; H04W 88/02; H04W 88/08; H04W 88/185;
(Continued)

(56) References Cited

U.S. PATENT DOCUMENTS 8,401,542 B2 * 3/2013 Chung et al. ............ 455/423
8,724,636 B2 * 5/2014 Chen et al. ......... H04W 72/042
(Continued)

FOREIGN PATENT DOCUMENTS

CN 104272688 A 3/2013
EP 1432261 A1 12/2002
(Continued)

OTHER PUBLICATIONS

International Search Report and Written Opinion of International Search Authority for PCT/CN2018/072038 dated Mar. 27, 2018 (9 pages).

(Continued)

*Primary Examiner* — Meless N Zewdu
(74) *Attorney, Agent, or Firm* — Imperium Patent Works; zheng jin

(57) ABSTRACT

A method to improve the design of new radio physical downlink control channel (NR-PDCCH) transmission and to reduce the false alarm rate of NR-PDCCH blind decoding is proposed. The downlink control information (DCI) bits are carried by NR-PDCCH to be transmitted to UEs after CRC attachment, channel encoding, interleaving, and modulation. The proposed NR-PDCCH design is separated into two parts. In a first part, a UE-ID or RNTI is used to derive a CRC mask or a scrambling sequence for CRC attachment of the DCI bits. In a second part, a UE-specific ID is used to derive an interleaver before or after channel encoding of the DCI bits. If the interleaver is placed before channel encoding, it takes the form of a bit interleaver. If the interleaver is placed after channel encoding, it takes the form of a bit interleaver or a channel interleaver.

12 Claims, 5 Drawing Sheets

Related U.S. Application Data

(60) Provisional application No. 62/444,397, filed on Jan. 10, 2017.

(51) Int. Cl.
*H04L 1/00* (2006.01)
*H04W 88/02* (2009.01)

(52) U.S. Cl.
CPC .......... *H04L 1/0061* (2013.01); *H04L 1/0072* (2013.01); *H04L 1/1812* (2013.01); *H04W 88/02* (2013.01)

(58) Field of Classification Search
CPC . H04W 4/005; H04W 48/12; H04W 72/1273; H04W 72/1289; H04W 74/00; H04W 74/006; H04W 72/02; H04W 72/0413; H04W 76/11; H04W 8/18; H04W 24/02; H04W 48/00; H04W 48/18; H04W 48/16; H04W 60/005; H04W 60/04; H04W 8/14; H04W 88/00; H04W 80/02; H04W 80/10; H04W 76/00; H04W 76/10; H04W 60/00; H04W 12/00; H04W 12/0013; H04W 12/0017; H04W 12/00516; H04W 12/06; H04B 14/066; G10H 2240/191; H04L 1/0009; H04L 1/0041; H04L 1/0061; H04L 1/0072; H04L 1/1812; H04L 1/00; H04L 5/0053; H04L 5/0048; H04L 1/18
See application file for complete search history.

(56) References Cited

U.S. PATENT DOCUMENTS

| | | | |
|---|---|---|---|
| 8,995,583 B2 * | 3/2015 | Mueller-Weinfurtner et al. .......... | H04L 1/0054 |
| 9,668,148 B2 * | 5/2017 | Hadani et al. ........ | H04W 24/02 |
| 9,872,123 B2 | 1/2018 | Webb et al. | |
| 10,051,618 B2 * | 8/2018 | Gho et al. ........... | H04W 72/042 |
| 10,440,703 B2 * | 10/2019 | Hwang et al. ...... | H04W 72/042 |
| 2008/0075176 A1 * | 3/2008 | Karr et al. .................... | 375/242 |
| 2008/0205349 A1 | 8/2008 | Kim et al. ................... | 370/335 |
| 2009/0257449 A1 | 10/2009 | Chen et al. .................. | 370/470 |
| 2010/0322080 A1 * | 12/2010 | Sung et al. .................. | 370/242 |
| 2012/0079359 A1 | 3/2012 | Buckley et al. ............. | 714/807 |
| 2013/0010724 A1 | 1/2013 | Han et al. .................... | 370/329 |
| 2013/0058240 A1 | 3/2013 | Kim et al. .................... | 370/252 |
| 2013/0061118 A1 | 3/2013 | Pi et al. ........................ | 714/807 |
| 2013/0077583 A1 * | 3/2013 | Kim ........................ | 370/329 |
| 2013/0242922 A1 * | 9/2013 | Suzuki et al. .... | H04W 72/0413 |
| 2014/0078978 A1 | 3/2014 | Cheng et al. ................. | 370/329 |
| 2014/0201592 A1 | 7/2014 | Shen et al. .................... | 714/758 |
| 2014/0204888 A1 * | 7/2014 | Chung et al. .......... | H04L 1/004 |
| 2014/0365845 A1 | 12/2014 | Pantelias et al. ............. | 714/758 |
| 2015/0033098 A1 | 1/2015 | Chui et al. .................... | 714/776 |
| 2015/0245350 A1 | 8/2015 | Webb et al. ................. | 370/329 |
| 2015/0381318 A1 | 12/2015 | Zhang et al. ................. | 370/335 |
| 2016/0234829 A1 * | 8/2016 | Takahashi et al. .......... | H04W 72/0413 |
| 2017/0041894 A1 * | 2/2017 | Lee et al. ......... | H04W 56/0015 |
| 2017/0094653 A1 | 3/2017 | Jitsukawa et al. ......... | 455/426.1 |
| 2017/0195096 A1 * | 7/2017 | Yamamoto et al. .......... | H04L 5/0048 |
| 2017/0245220 A1 * | 8/2017 | Ouchi et al. ........ | H04W 52/146 |
| 2018/0115991 A1 * | 4/2018 | Yang et al. ....... | H04W 74/0808 |
| 2018/0145818 A1 | 5/2018 | Choi et al. | |
| 2018/0167129 A1 * | 6/2018 | Aiba et al. ........... | H04B 7/0805 |
| 2018/0167932 A1 | 6/2018 | Papasakellariou | |
| 2018/0198560 A1 * | 7/2018 | Jiang et al. ........... | H04L 1/0064 |
| 2018/0206214 A1 | 7/2018 | Bendlin et al. | |
| 2018/0323934 A1 | 11/2018 | Suzuki et al. | |
| 2018/0375627 A1 | 12/2018 | Suzuki et al. | |
| 2019/0053316 A1 * | 2/2019 | Aiba et al. ............ | H04W 76/27 |
| 2019/0223208 A1 * | 7/2019 | Yoshimoto et al. ......... | H04W 72/1289 |
| 2019/0229847 A1 * | 7/2019 | Yoshimura et al. ......... | H04L 1/0047 |
| 2019/0268926 A1 * | 8/2019 | Yoshimura et al. ......... | H04W 72/1268 |
| 2019/0327030 A1 * | 10/2019 | Yoshimoto et al. ......... | H04L 1/1607 |

FOREIGN PATENT DOCUMENTS

| | | |
|---|---|---|
| EP | 2955891 A1 | 3/2013 |
| WO | WO2015194014 A1 | 6/2014 |

OTHER PUBLICATIONS

EPO, search report for the EP patent application 18738490.4 dated Jan. 3, 2020 (8 pages).

* cited by examiner

PHYSICAL DOWNLINK CONTROL CHANNEL DESIGN FOR 5G NEW RADIO

CROSS REFERENCE TO RELATED APPLICATIONS

This application is a continuation, and claims priority under 35 U.S.C. § 120 from nonprovisional U.S. patent application Ser. No. 15/865,229, entitled "Physical Downlink Control Channel Design for 5G New Radio," filed on Jan. 8, 2018, the subject matter of which is incorporated herein by reference. Application Ser. No. 15/865,229, in turn, claims priority under 35 U.S.C. § 119 from U.S. Provisional Application No. 62/444,397 entitled "NR PDCCH Design" filed on Jan. 10, 2017, the subject matter of which is incorporated herein by reference.

TECHNICAL FIELD

The disclosed embodiments relate to Hybrid Automatic Repeat Request (HARQ) operation, and more specifically, to Physical Downlink Control Channel (PDCCH) design in next generation 5G new radio (NR) mobile communication networks.

BACKGROUND

A Long-Term Evolution (LTE) system offers high peak data rates, low latency, improved system capacity, and low operating cost resulting from simple network architecture. An LTE system also provides seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred as user equipments (UEs). Enhancements to LTE systems are considered so that they can meet or exceed International Mobile Telecommunications Advanced (IMT-Advanced) fourth generation (4G) standard. Multiple access in the downlink is achieved by assigning different sub-bands (i.e., groups of subcarriers, denoted as resource blocks (RBs)) of the system bandwidth to individual users based on their existing channel condition. In LTE networks, Physical Downlink Control Channel (PDCCH) is used for dynamic downlink scheduling. Typically, PDCCH can be configured to occupy the first one, two, or three OFDM symbols in a subframe of each radio frame.

The signal bandwidth for next generation 5G new radio (NR) systems is estimated to increase to up to hundreds of MHz for below 6 GHz bands and even to values of GHz in case of millimeter wave bands. Furthermore, the NR peak rate requirement can be up to 20 Gbps, which is more than ten times of LTE. Three main applications in 5G NR system include enhanced Mobile Broadband (eMBB), Ultra-Reliable Low Latency Communications (URLLC), and massive Machine-Type Communication (MTC) under milli-meter wave technology, small cell access, and unlicensed spectrum transmission. Multiplexing of eMBB & URLLC within a carrier is also supported.

A plurality of physical resource blocks (PRBs) is allocated for PDCCH transmission that carry downlink control information (DCI). PDCCH for next generation NR systems is referred to as NR-PDCCH. In order to decode NR-PDCCH targeted specifically to a UE, the UE needs to find out where its NR-PDCCH is. In the so-called "blindly" decoding process, the UE must try a number of candidate NR-PDCCHs before knowing which NR-PDCCH is targeted for itself. The allocated radio resources of the candidate NR-PDCCHs may be distributed or localized. In addition, the NR-PDCCHs may constitute a common search space (CSS) or a UE-specific search space (UESS). As a result, the aggregated radio resources of candidate NR-PDCCHs for different UEs may be different. In other words, NR-PDCCH may be UE-specific and it is beneficial for blind decoding. With UE-specific NR-PDCCH transmission, the size of search space for each UE can be reduced for smaller number of blind decoding candidates.

To reduce false alarm rate of NR-PDCCH decoding, the DCI information bits are attached with CRC bits, and the CRC attachment is masked by UE ID. Alternatively, a scrambling sequence initiated by UE ID is generated and scrambled to the DCI information bits. However, both methods are equivalent in false alarm rate. Applying a scrambling sequence does not address the false detection problem. A solution to improve the design of NR-PDCCH transmission and to reduce the false alarm rate of NR-PDCCH blind decoding is sought.

SUMMARY

A method to improve the design of new radio physical downlink control channel (NR-PDCCH) transmission and to reduce the false alarm rate of NR-PDCCH blind decoding is proposed. The downlink control information (DCI) bits are carried by NR-PDCCH to be transmitted to UEs after CRC attachment, channel encoding, interleaving, and modulation. The proposed NR-PDCCH design is separated into two parts. In a first part, a UE-ID or RNTI is used to derive a CRC mask or a scrambling sequence for CRC attachment of the DCI bits. In a second part, a UE-specific ID is used to derive an interleaver before or after channel encoding of the DCI bits. If the interleaver is placed before channel encoding, it takes the form of a bit interleaver. If the interleaver is placed after channel encoding, it takes the form of a bit interleaver or a channel interleaver. If channel interleaver is utilized, the channel interleaver subsumes the mapping of modulation symbols to physical locations on the time-frequency grid.

In one embodiment, a method of DCI transmission with UE-specific cyclic shifting is proposed. A base station generates a plurality of information bits containing downlink control information for a user equipment (UE) in a mobile communication network. The plurality of information bits is attached with a plurality of cyclic redundancy check (CRC) bits. The base station performs channel encoding on the plurality of information bits with CRC and outputting a plurality of encoded bits. The base station applies cyclic-shifting before or after the channel encoding using a UE-specific ID. The base station transmits the downlink control information over allocated radio resources of a physical downlink control channel (PDCCH) to the UE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
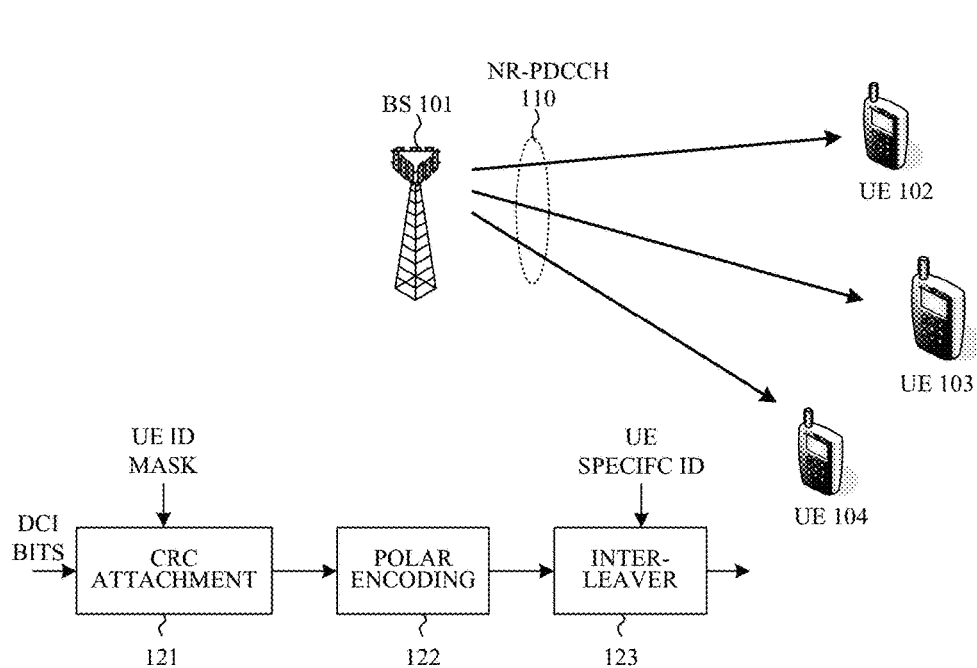
FIG. 1 illustrates a next generation new radio (NR) mobile communication network with NR control channel design in accordance with one novel aspect.

FIG. 1 illustrates a next generation new radio (NR) mobile communication network 100 with NR physical downlink control channel (NR-PDCCH) design in accordance with one novel aspect. Mobile communication network 100 is an OFDM/OFDMA system comprising a base station BS 101 and a plurality of user equipment UE 102, UE 103, and UE 104. When there is a downlink packet to be sent from the BS to the UE, each UE gets a downlink assignment, e.g., a set of radio resources in a physical downlink shared channel (PDSCH). When a UE needs to send a packet to the BS in the uplink, the UE gets a grant from the BS that assigns a physical uplink shared channel (PUSCH) consisting of a set of uplink radio resources. The UE gets the downlink or uplink scheduling information from an NR-PDCCH that is targeted specifically to that UE. In addition, broadcast control information is also sent in the NR-PDCCH to all UEs in a cell. The downlink and uplink scheduling information and the broadcast control information, carried by the NR-PDCCH, together is referred to as downlink control information (DCI).

In the example of FIG. 1, an NR physical downlink control channel (NR-PDCCH) 110 is used for BS 101 to send DCI to the UEs. In 3GPP LTE system based on OFDMA downlink, the radio resource is partitioned into subframes, each of which is comprised of two slots and each slot has seven OFDMA symbols along time domain. Each OFDMA symbol further consists of a number of OFDMA subcarriers along frequency domain depending on the system bandwidth. The basic unit of the resource grid is called Resource Element (RE), which spans an OFDMA subcarrier over one OFDMA symbol. A physical resource block (PRB) occupies one slot and twelve subcarriers, while a PRB pair occupies two consecutive slots in one subframe. Each NR-PDCCH is associated with a set of control channel elements (CCEs) to potentially carry the DCI. The base station maps a plurality of REs to each CCE based on an RE to CCE mapping rule. The base station encodes the downlink control information over the set of CCEs to be transmitted to a UE if the DCI is intended for that UE.

Comparing to LTE numerology (subcarrier spacing and symbol length), in next generation 5G NR systems, multiple numerologies are supported and the radio frame structure gets a little bit different depending on the type of numerology. However, regardless of numerology, the length of one radio frame is always 10 ms, and the length of a subframe/slot is always 1 ms. In addition, the general operation of NR-PDCCH transmission remains the same as PDCCH transmission in LTE.

In order to decode NR-PDCCH targeted specifically to a UE, the UE needs to find out where its NR-PDCCH is. In the so-called "blindly" decoding process, the UE must try a number of candidate NR-PDCCHs before knowing which NR-PDCCH is targeted for itself. The NR-PDCCHs may constitute a common search space (CSS) or a UE-specific search space (UESS). As a result, the aggregated radio resources of candidate NPDCCHs for different UEs may be different. In other words, NR-PDCCH may be UE-specific and it is beneficial for blind decoding. With UE-specific NR-PDCCH, the size of search space for each UE can be reduced for smaller number of blind decoding candidates. However, it is inevitable for UEs to have false detection from the candidate NR-PDCCHs.

To reduce false alarm rate of NR-PDCCH decoding, the DCI information bits are attached with cyclic redundancy check (CRC) bits, and the CRC attachment is then masked by UE ID. Alternatively, a scrambling sequence initiated by UE ID is generated and scrambled to DCI bits. However, both methods are equivalent in false alarm rate. Applying a scrambling sequence does not address the false detection problem. In accordance with one novel aspect, a solution to improve the design of NR-PDCCH transmission and to reduce the false alarm rate of NR-PDCCH decoding is proposed. In the example of FIG. 1, NB-PDCCH carries DCI bits, which is attached with CRC bits scrambled with UE ID mask (step 121), and then encoded with Polar coding (step 122). The encoded bits are interleaved based on a UE-specific ID to be transmitted to each UE (step 123). In one example, the interleaver 123 is a UE-specific cyclic shifter using the UE-specific ID. By applying additional UE-specific interleaving, the false alarm rate of NR-PDCCH decoding can be reduced. Note step 123 can occur before or after step 122.

Figure 2:
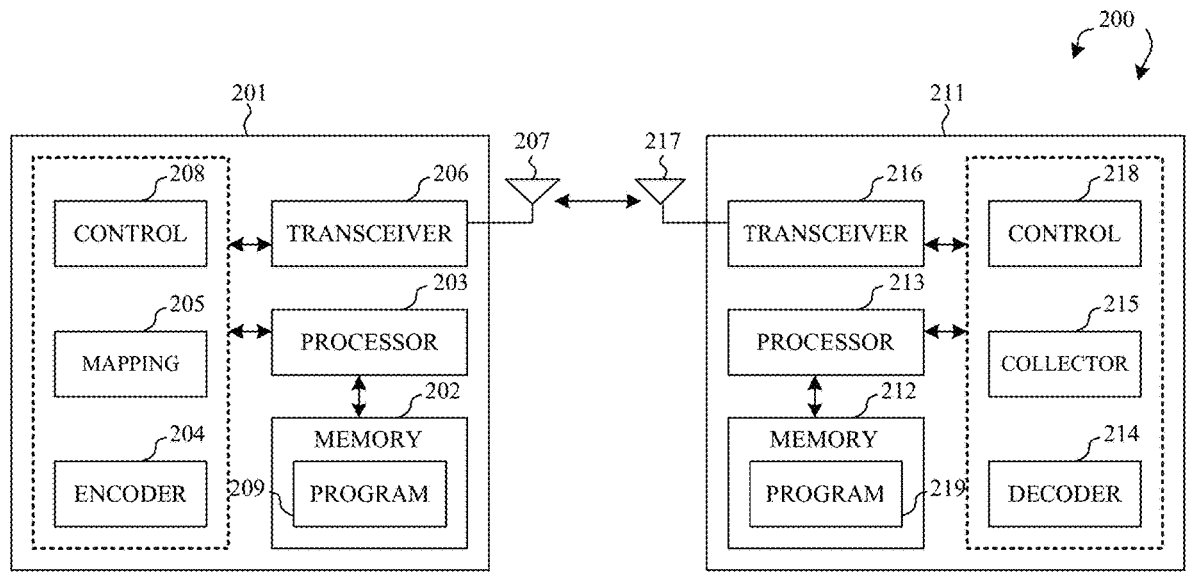
FIG. 2 illustrates simplified block diagrams of a base station and a user equipment in accordance with embodiments of the present invention.

FIG. 2 illustrates simplified block diagrams of a base station 201 and a user equipment 211 in accordance with embodiments of the present invention. For base station 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in base station 201. Memory 202 stores program instructions and data 209 to control the operations of the base station.

Similar configuration exists in UE 211 where antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in UE 211. Memory 212 stores program instructions and data 219 to control the operations of the UE.

The base station 201 and UE 211 also include several functional modules and circuits to carry out some embodiments of the present invention. The different functional modules and circuits can be implemented by software, firmware, hardware, or any combination thereof. In one example, each function module or circuit comprises a processor together with corresponding program codes. The function modules and circuits, when executed by the processors 203 and 213 (e.g., via executing program codes 209 and 219), for example, allow base station 201 to encode and transmit downlink control information to UE 211, and allow UE 211 to receive and decode the downlink control information accordingly.

In one embodiment, base station 201 configures a set of radio resource for NR-PDCCH transmission via control module 208 and maps the downlink control information to the configured REs via mapping module 205. The downlink control information carried in NR-PDCCH is then modulated and encoded via encoder 204 to be transmitted by transceiver 206 via antenna 207. UE 211 receives the downlink control information by transceiver 216 via antenna 217. UE 211 determines the configured radio resource for NR-PDCCH transmission via control module 218 and collects the configured REs via collector 215. UE 211 then demodulates and decodes the downlink information from the collected REs via decoder 214. In one example, encoder 204 applies Polar encoding with UE-specific cyclic shifting before or after the Polar encoding to reduce false alarm rate of the NR-PDCCH decoding.

Figure 3:
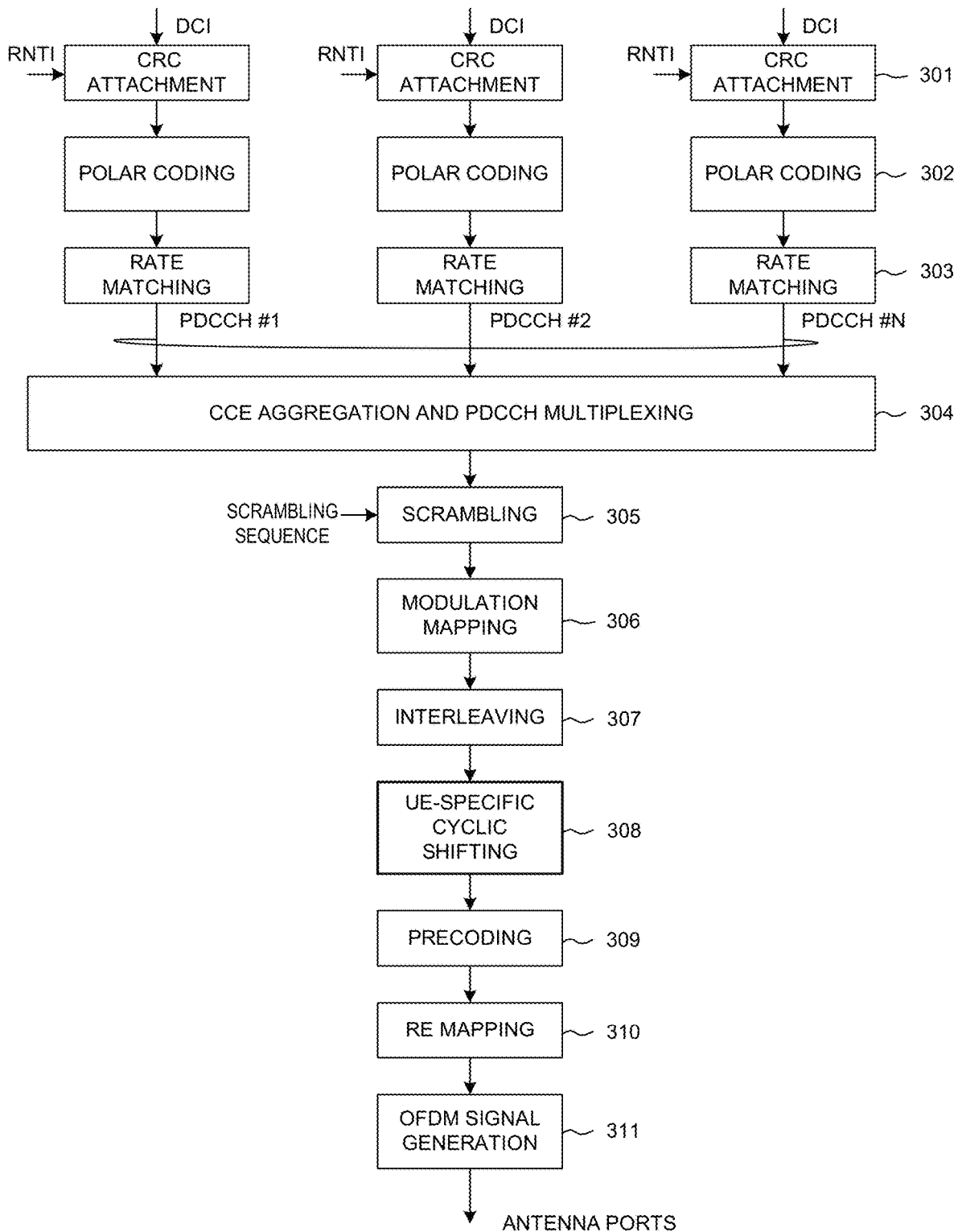
FIG. 3 illustrates functional blocks of a transmitting device in a communication system that encodes information bits of DCI to codewords and then map to baseband signals for transmission in accordance with one novel aspect.

FIG. 3 illustrates functional blocks of a transmitting device in a communication system that encodes information bits of DCI to codewords and then map to baseband signals for transmission in accordance with one novel aspect. In step 301, the information bits of DCI are arranged into transport blocks (TBs) and attached with CRC. In addition, the TBs are segmented into code blocks and attached with CRC. Optionally, the CRC bits are scrambled with a corresponding Radio Network Temporary Identifier (RNTI) of a receiver UE. In step 302, channel coding (e.g., Polar coding) is performed with certain code rate. In step 303, rate matching is performed, which creates an output with a desired code rate, and where the TBs are mapped into codewords for PDCCH transmission. In step 304, CCE aggregation and PDCCH multiplexing are performed. In step 305, the codewords are scrambled based on predefined scrambling rule (e.g., scramble with cell ID). In step 306, modulation mapping is performed, where the codewords are modulated based on various modulation orders (e.g., PSK, QAM) to create complex-valued modulation symbols. In step 307, a configured function for channel interleaving is performed on the modulated symbol. In step 308, a novel UE-specific cyclic shifting is performed on the interleaved symbol (e.g., using another UE-specific configurable ID with 275 candidate values). In step 309, precoding is performed with certain precoding matrix for each antenna port. In step 310, the complex-valued symbols for each antenna are mapped onto corresponding resource elements (REs) of physical resource blocks (PRBs). Finally, in step 311, OFDM signals are generated for baseband signal NR-PDCCH transmission via the antenna ports.

The mapping rules in these functional blocks should be known for a receiving device to receive the transport blocks. A UE receives information-bearing signal propagating though wire channel or wireless channel and processes it to recover the transport block. For the UE to receive TBs carried by PDSCH, it first needs to know the DCI carried by PDCCH associated with these transport blocks. The DCI indicates the rules that map the information bits of each TB to the modulated symbols carried on PDSCH, the RB-allocation for the encoded and modulated symbols of the transport blocks, information related to the reference signals used for channel estimation, and power control commands. UE decodes the TBs based on received control information and the configured parameters provided by network. Therefore, it is critical for the UE to be able to blindly decode the DCI carried by NR-PDCCH correctly. The UE-specific cyclic shifting (step 308) is thus proposed to reduce the false detection for NR-PDCCH blind decoding.

Figure 4:
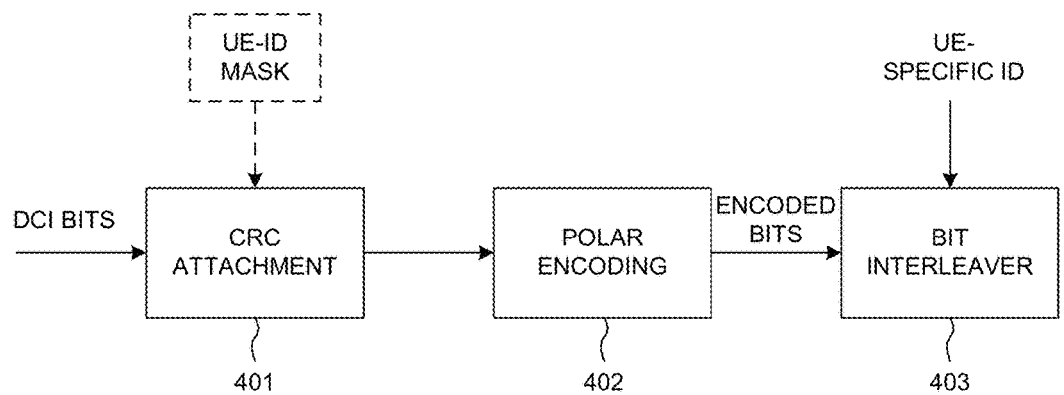
FIG. 4 illustrates a first embodiment of DCI transmission with UE-specific cyclic shifting after polar encoding in accordance with embodiments of the present invention.

In general, an interleaver is a mapping function from the order of elements at the input to the order of elements at the output. Cyclic shift can be considered as a specific type of interleaver. One example of cyclic shift based on a configurable ID A1 is illustrated by equation (1) below:

$$z(i)=w((i+A1) \bmod N), i=0,1,\ldots,N-1 \qquad (1)$$

Where $z(i)$, $i=0, 1, \ldots, N-1$, is the output of the cyclic shift $w(i)$, $i=0, 1, \ldots, N-1$, is the input of the cyclic shift A1 is a configurable ID FIG. 4 illustrates a first embodiment of DCI transmission with UE-specific cyclic shifting after polar encoding in accordance with embodiments of the present invention. Note that not all steps of DCI transmission are depicted in FIG. 4. Instead, only certain relevant steps are illustrated. In step 401, a transmitting device, e.g., a base station (BS) takes the DCI bits as input for CRC attachment. Optionally, the CRC bits are scrambled with a corresponding UE ID of a receiver UE. In one example, such scrambling involves an exclusive-OR operation between the CRC bits and the UE ID. In step 402, channel coding is performed with certain code rate. In one example, Polar codes are used for the channel encoding. In step 403, the encoded bits are applied with a bit-interleaver using a UE-specific ID. In one example, the UE-specific ID is an ID that is configured by the network based on certain characteristics of the UE, and the value of the UE-specific ID determines how many bits will be cyclic shifted on the encoded bits. For example, the UE-specific ID determines the value of A1 in equation (1).

Figure 5:
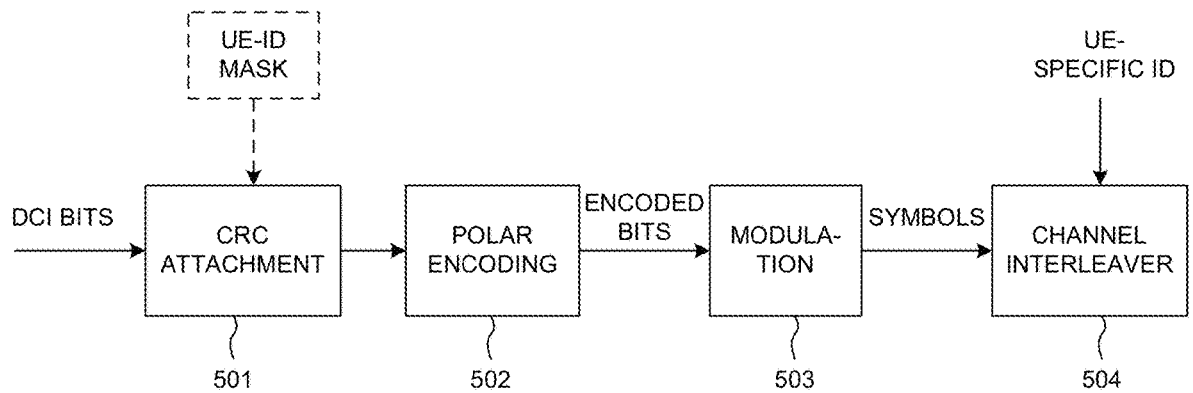
FIG. 5 illustrates a second embodiment of DCI transmission with UE-specific cyclic shifting after modulation mapping in accordance with embodiments of the present invention.

FIG. 5 illustrates a second embodiment of DCI transmission with UE-specific cyclic shifting after modulation mapping in accordance with embodiments of the present invention. Note that not all steps of DCI transmission are depicted in FIG. 5. Instead, only certain relevant steps are illustrated. In step 501, a transmitting device, e.g., a base station (BS) take the DCI bits as input for CRC attachment. Optionally, the CRC bits are scrambled with a corresponding UE-ID of a receiver UE. In step 502, channel coding (e.g., Polar coding) is performed with certain code rate. In step 503, modulation mapping is performed, where the encoded bits are modulated based on various modulation orders (e.g., PSK, QAM) to create complex-valued modulation symbols. In step 504, the modulated symbols are applied with a channel-interleaver using a UE-specific ID. In one example, the UE-specific ID is an ID that is configured by the network based on certain characteristics of the UE, and the channel interleaver can be considered to subsume the mapping of the modulation symbols to physical locations on the time-frequency grids in a slot. For example, the sequence of modulation symbols is represented as $w(i)$ in equation (1).

The output of the channel interleaver is z(i) in equation (1), wherein A1 depends on the UE-specific ID.

Figure 6:
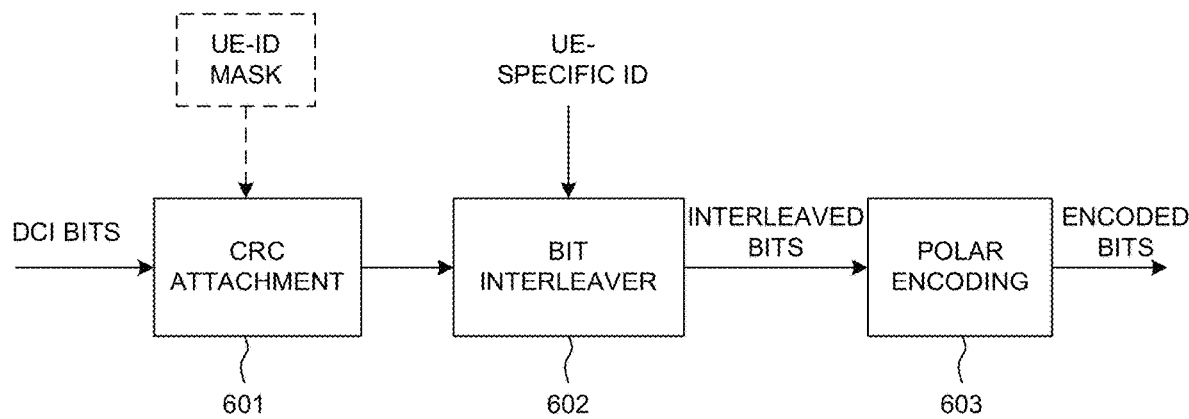
FIG. 6 illustrates a third embodiment of DCI transmission with UE-specific cyclic shifting before polar encoding in accordance with embodiments of the present invention.

FIG. 6 illustrates a third embodiment of DCI transmission with UE-specific cyclic shifting before polar encoding in accordance with embodiments of the present invention. Note that not all steps of DCI transmission are depicted in FIG. 6. Instead, only certain relevant steps are illustrated. In step 601, a transmitting device, e.g., a base station (BS) take the DCI bits as input for CRC attachment. The CRC bits are scrambled with a UE-ID of a receiver UE. In one example, such scrambling involves an exclusive-OR operation between the CRC bits and the UE ID. In step 602, the DCI bits with CRC attachment are applied with a bit-interleaver using a UE-specific ID. In one example, the value of the UE-specific ID determines how many bits will be cyclic shifted on the DCI bits. In step 603, channel coding (e.g., Polar coding) is performed with certain code rate for later processing.

Figure 7:
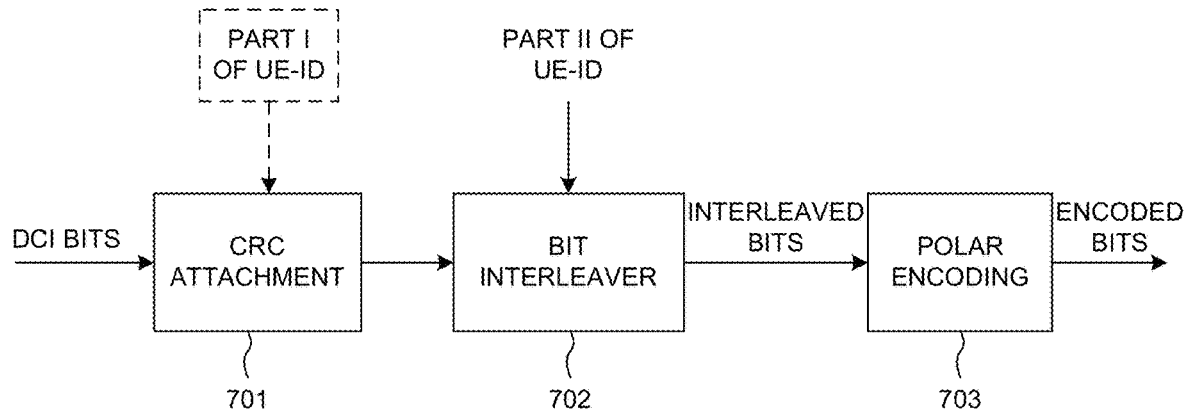
FIG. 7 illustrates a fourth embodiment of DCI transmission with UE-specific cyclic shifting before polar encoding in accordance with embodiments of the present invention.

FIG. 7 illustrates a fourth embodiment of DCI transmission with UE-specific cyclic shifting before polar encoding in accordance with embodiments of the present invention. Note that not all steps of DCI transmission are depicted in FIG. 7. Instead, only certain relevant steps are illustrated. In step 701, a transmitting device, e.g., a base station (BS) take the DCI bits as input for CRC attachment. The CRC bits are scrambled with a first part of a corresponding UE-ID of a receiver UE. In one example, such scrambling involves an exclusive-OR operation between the CRC bits and the first part of the UE ID. In step 702, the DCI bits with CRC attachment are applied with a bit-interleaver using a second part of the corresponding UE-ID. In one example, the value of the second part of the UE-ID determines how many bits will be cyclic shifted on the DCI bits. In step 703, channel coding (e.g., Polar coding) is performed with certain code rate.

Figure 8:
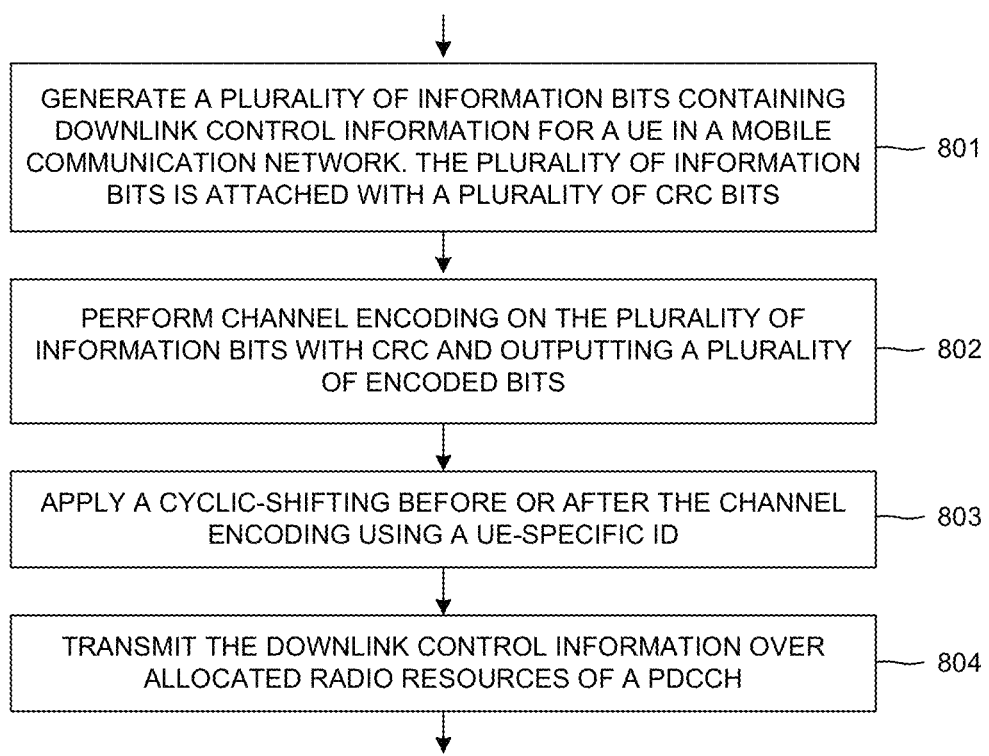
FIG. 8 is a flow chart of a method of DCI transmission with UE-specific cyclic shifting in accordance with one novel aspect.

FIG. 8 is a flow chart of a method of DCI transmission with UE-specific cyclic shifting in accordance with one novel aspect. In step 801, a base station generates a plurality of information bits containing downlink control information for a user equipment (UE) in a mobile communication network. The plurality of information bits is attached with a plurality of cyclic redundancy check (CRC) bits. In step 802, the base station performs channel encoding on the plurality of information bits with CRC and outputting a plurality of encoded bits. In step 803, the base station applies cyclic-shifting before or after the channel encoding using a UE-specific ID. In step 804, the base station transmits the downlink control information over allocated radio resources of a physical downlink control channel (PDCCH) to the UE.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   performing demodulation de-mapping on a plurality of modulation symbols and thereby outputting a plurality of encoded bits over allocated radio resources of a physical downlink control channel (PDCCH) by a user equipment (UE) in a mobile communication network;
   performing channel decoding on the plurality of encoded bits and thereby outputting a plurality of decoded bits;
   applying cyclic shifting before the demodulation de-mapping using a UE-specific ID, wherein a value of the UE-specific ID is used to derive an interleaver for applying the cyclic shifting, wherein the cyclic shifting is a type of channel interleaving; and
   detecting downlink control information (DCI) by detaching a plurality of cyclic redundancy check (CRC) bits from the plurality of decoded bits.

2. The method of claim 1, wherein the plurality of CRC bits is masked by a UE ID.

3. The method of claim 1, wherein the cyclic-shifting is applied on the plurality of encoded bits before the channel decoding.

4. The method of claim 1, wherein the UE de-interleaves received symbols from different physical locations of the allocated radio resources.

5. The method of claim 1, wherein the plurality of encoded bits is also descrambled and deinterleaved after the PDCCH reception by the UE.

6. The method of claim 1, wherein the UE-specific ID is a configurable ID received from the network by the UE.

7. A receiving device comprising:
   a demodulator that performs demodulation de-mapping on a plurality of modulation symbols and thereby outputting a plurality of encoded bits over allocated radio resources of a physical downlink control channel (PDCCH) by a user equipment (UE) in a mobile communication network;
   a channel decoder that performs channel decoding on the plurality of encoded bits and thereby outputting a plurality of decoded bits;
   an interleaver that applies cyclic shifting before the demodulation de-mapping using a UE-specific ID, wherein a value of the UE-specific ID is used to derive an interleaver for applying the cyclic shifting, wherein the cyclic shifting is a type of channel interleaving; and
   a receiver that detects downlink control information (DCI) by detaching a plurality of cyclic redundancy check (CRC) bits from the plurality of decoded bits.

8. The device of claim 7, wherein the plurality of CRC bits is masked by a UE ID.

9. The device of claim 7, wherein the cyclic-shifting is applied on the plurality of encoded bits before the channel decoding.

10. The device of claim 7, wherein the UE de-interleaves received symbols from different physical locations of the allocated radio resources.

11. The device of claim 7, wherein the plurality of encoded bits is also descrambled and deinterleaved after the PDCCH reception by the UE.

12. The device of claim 7, wherein the UE-specific ID is a configurable ID received from the network by the UE.

* * * * *